US011168624B2

(12) United States Patent
Halbe et al.

(10) Patent No.: US 11,168,624 B2
(45) Date of Patent: Nov. 9, 2021

(54) COMPRESSOR OUTLET PRESSURE CONTROL FOR IMPROVED ENGINE SPEED STABILITY AND PERFORMANCE USING COMPRESSOR RECIRCULATION VALVE AND TURBOCHARGER WASTEGATE

(71) Applicant: Cummins Inc., Columbus, IN (US)

(72) Inventors: Mayura H Halbe, Columbus, IN (US); Robert J. Thomas, Indianapolis, IN (US); Ming-Feng Hsieh, Nashville, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/902,698

(22) Filed: Jun. 16, 2020

(65) Prior Publication Data
US 2020/0309049 A1    Oct. 1, 2020

Related U.S. Application Data

(63) Continuation of application No. PCT/US2018/059324, filed on Nov. 6, 2018.
(Continued)

(51) Int. Cl.
*F02D 41/00*    (2006.01)
*F02M 26/05*    (2016.01)
(Continued)

(52) U.S. Cl.
CPC ........ *F02D 41/0007* (2013.01); *F02B 37/162* (2019.05); *F02B 37/18* (2013.01);
(Continued)

(58) Field of Classification Search
CPC ........ F02D 41/0007; F02D 2200/0406; F02M 26/05; F02M 26/06; F02B 37/162; F02B 37/18; F02B 37/225; Y02T 10/12
See application file for complete search history.

(56) References Cited

U.S. PATENT DOCUMENTS

| 4,467,607 A | 8/1984 | Rydquist et al. |
| 5,605,044 A | 2/1997 | Zimmer et al. |
(Continued)

FOREIGN PATENT DOCUMENTS

| CA | 2999005 | 3/2017 |
| CN | 106640347 | 5/2017 |
(Continued)

OTHER PUBLICATIONS

Search Report and Written Opinion, PCT Appln. No. PCT/US2018/059324, 11 pgs. dated Jan. 4, 2019.
(Continued)

*Primary Examiner* — Audrey B. Walter
*Assistant Examiner* — Edward Bushard
(74) *Attorney, Agent, or Firm* — Taft Stettinius & Hollister LLP

(57) ABSTRACT

Systems, methods and apparatus are disclosed for producing a target compressor outlet pressure that is based on a desired pressure differential across an intake throttle of an internal combustion engine and an intake manifold pressure by opening or closing a compressor recirculation valve and a turbocharger wastegate to commanded positions based on the target compressor outlet pressure.

18 Claims, 3 Drawing Sheets

Related U.S. Application Data

(60) Provisional application No. 62/599,921, filed on Dec. 18, 2017.

(51) Int. Cl.
   *F02M 26/06* (2016.01)
   *F02B 37/16* (2006.01)
   *F02B 37/18* (2006.01)
   *F02B 37/22* (2006.01)

(52) U.S. Cl.
   CPC ........... *F02B 37/225* (2013.01); *F02M 26/05* (2016.02); *F02M 26/06* (2016.02); *F02D 2200/0406* (2013.01)

(56) References Cited

U.S. PATENT DOCUMENTS

| | | |
|---|---|---|
| 6,134,888 A | 10/2000 | Zimmer et al. |
| 9,587,556 B2 | 3/2017 | Wang et al. |
| 9,657,635 B2 | 5/2017 | Wang et al. |
| 2006/0137340 A1 | 6/2006 | Stewart |
| 2009/0107140 A1 | 4/2009 | Pursiful |
| 2013/0118166 A1* | 5/2013 | Bjorge ................. F02B 37/007 60/605.2 |
| 2013/0133634 A1 | 5/2013 | Hiraoka et al. |
| 2015/0114346 A1 | 4/2015 | Surnilla et al. |
| 2016/0160771 A1 | 6/2016 | Wang et al. |
| 2018/0252167 A1* | 9/2018 | Suzuki ...................... F02D 9/02 |
| 2020/0072140 A1 | 3/2020 | Qin et al. |

FOREIGN PATENT DOCUMENTS

| | | |
|---|---|---|
| DE | 102015110835 A1 | 1/2016 |
| DE | 102015117145 A1 | 4/2016 |
| EP | 2725211 A1 | 4/2014 |
| WO | 2017023333 | 2/2017 |

OTHER PUBLICATIONS

Supplemental European Search Report, EP Appn. No. 18891930.2, dated Jun. 21, 2021, 7 pgs.

* cited by examiner

COMPRESSOR OUTLET PRESSURE CONTROL FOR IMPROVED ENGINE SPEED STABILITY AND PERFORMANCE USING COMPRESSOR RECIRCULATION VALVE AND TURBOCHARGER WASTEGATE

CROSS-REFERENCE TO RELATED APPLICATIONS

The present application is a continuation of International Patent Application No. PCT/US18/59324 filed on Nov. 6, 2018, which claims the benefit of the filing date of U.S. Provisional Application No. 62/599,921 filed on Dec. 18, 2017, each of which is incorporated herein by reference in its entirety for all purposes.

BACKGROUND

Certain types of engines are subject to uncertainties in combustion due to various noise factors such as fuel quality and ambient conditions. For example, the variation in fuel quality and ambient conditions can be particularly problematic for lean burn natural gas engines. Steady state brake thermal efficiency can be improved by minimizing pressure loss across the intake throttle. However, when the intake throttle is near a fully open position, valve dynamics indicate there is little change in flow across the valve, which limits the controllability of engine speed using the intake throttle. Therefore, further technological developments are desirable in this area.

SUMMARY

Unique systems, methods and apparatus are disclosed for providing a target pressure differential across an intake throttle of an internal combustion engine (i.e. the engine boost or torque reserve) by controlling a compressor recirculation valve position and a turbocharger wastegate position to a commanded position.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
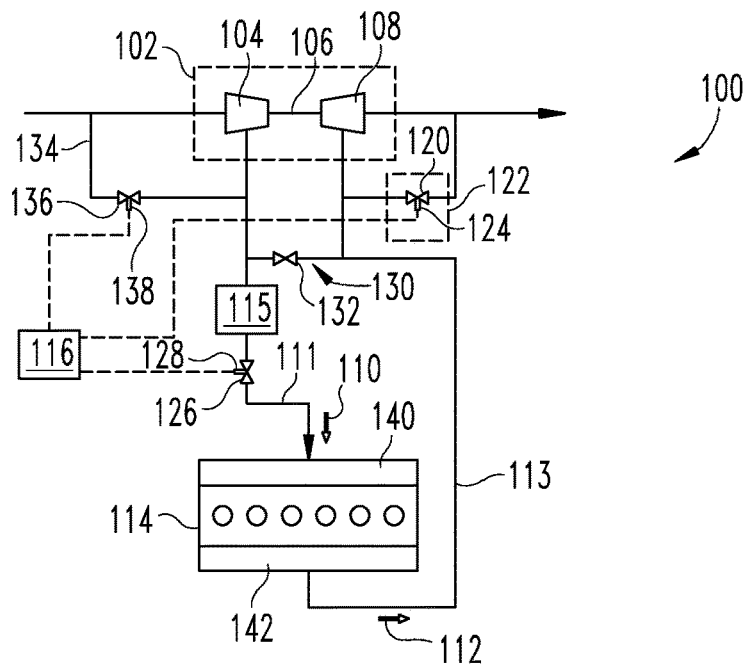
FIG. 1 is a schematic diagram of a system including an intake throttle, a compressor recirculation valve, and a turbocharger with a wastegate.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 for controlling a turbocharger 102 is schematically depicted. The system 100 includes an internal combustion engine 114 which may be an engine of any type, including at least a compression ignition engine, a spark ignition engine, a diesel engine, a gasoline engine, a natural gas engine, and combinations of these. The engine 114 emits exhaust gases 112 through an exhaust manifold 142, and exhaust gases 112 flow to the turbocharger 102 in an exhaust conduit 113, and transfer a portion of the kinetic and/or thermodynamic energy of the exhaust gases to the turbine 108 of the turbocharger 102. The transferred energy passes through a shaft 106 of the turbocharger 102 to a compressor 104 of the turbocharger 102. Compressor 104 provides compressed intake air 110 to engine 114 with an intake conduit 111.

The compressed intake flow 110 is sometimes called charge air, charge gases, charge flow, intake air, or other terms, none of which are limiting. The compressed intake flow 110 may pass through a charge cooler 115 before being received by the engine 114. The charge cooler 115 helps provide for increased air density for the intake flow 110 in the engine 114, although the cooling reduces the pressure of the compressed intake flow 110. The charge cooler may be provided as shown, or arranged to provide after-cooling, two stage after-cooling, or any other charge cooler arrangement. The presence and operations of a charge cooler, if present, are well understood and not important to the operations of the turbocharger 102.

Intake conduit 111 further includes an intake throttle 126 that controls the charge flow to the intake manifold 140 of engine 114. Intake throttle 126 can include a throttle actuator 128 connected to a controller 116 that controls an opening and closing of intake throttle 126 to provide a desired intake flow amount to the intake of engine 114.

Certain features such as an exhaust throttle, an air filter, an intake air heater, and/or exhaust gas recirculation cooler, may be present or not in system 100. The presence and operations of such features are not depicted to enhance the clarity of the description.

The turbocharger 102 includes a wastegate 120 that allows exhaust gases 112 to bypass turbine 106. Wastegate 120 includes a WG valve 122 operably connected to a controllable WG actuator 124 that is operable to open and close WG valve 122 to control the size of the opening of wastegate 120 in response to one or more wastegate actuator position commands from controller 116.

The turbocharger 102 also includes a compressor recirculation flow path 134 that allows the intake flow to bypass or be recirculated around compressor 104. In the illustrated embodiment, compressor recirculation flow path 134 is connected upstream of charge cooler 115. In another embodiment, compressor recirculation flow path 134 is connected downstream of charge cooler 115. Other connection arrangements entry and exit of the compressor recirculation flow path are also contemplated. Compressor recirculation flow path 134 includes a compressor recirculation valve (CRV) 136 operably connected to a controllable CRV actuator 138 that is operable to open and close CRV 136 to control the size of the opening of compressor recirculation flow path 134 in response to one or more compressor recirculation valve actuator position commands from controller 116.

In one embodiment, system 100 includes an exhaust gas recirculation (EGR) flow path 130 which fluidly couples the engine exhaust side to the engine intake side. The EGR flowpath 130 may fluidly couple the exhaust manifold to the intake manifold, or any other portion of the exhaust system to any other portion of the intake system. The EGR flowpath 130 may include an EGR valve 132 in the example, although the EGR flowpath 130 may additionally or alternatively include an EGR cooler (not shown) and may further include EGR cooler bypass (not shown.) The EGR flowpath 130 may couple to the intake system at a position upstream or downstream of charge cooler 115, and upstream or downstream of intake throttle 126. The depicted EGR flowpath 130 in the system 100 is a "high pressure" EGR system, coupling the exhaust system upstream of the turbine 106 to the intake system downstream of the compressor 104. However, the EGR flowpath 130, where present, may be additionally or alternatively a low pressure EGR system coupling the exhaust system downstream of the turbine 108 to the intake system upstream of the compressor 104. The presence and type of EGR system and EGR components present is entirely optional and not limiting to the present disclosure.

The system 100 includes controller 116 structured to perform certain operations to control the wastegate valve 122 and compressor recirculation valve 136. In certain embodiments, the controller 116 forms a portion of a processing subsystem including one or more computing devices having memory, processing, and communication hardware. The controller may be a single device or a distributed device, and the functions of the controller may be performed by hardware and/or by a computer executing instructions stored in non-transient memory on one or more computer readable media.

In certain embodiments, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or by a computer executing instructions stored in non-transient memory on one or more computer readable media, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any module or controller described herein that would be understood by one of skill in the art is contemplated herein. The modules and controllers herein, once the operations are described, are capable of numerous hardware and/or computer based implementations, many of the specific implementations of which involve mechanical steps for one of skill in the art having the benefit of the disclosures herein and the understanding of the operations of the modules and the controllers provided by the present disclosure. More specific descriptions of certain embodiments of controller operations are included in the section referencing FIG. 5.

Certain operations described herein include operations to interpret or determine one or more parameters. Interpreting or determining, as utilized herein, includes an operation to have the value made available by any method known in the art, including at least receiving the value from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any method known in the art (e.g. from an operator input), receiving a value by which the interpreted or determined parameter can be calculated, and/or by referencing a default value that is interpreted or determined to be the parameter value.

The schematic flow diagrams and related descriptions which follow provide illustrative embodiments of performing procedures for controlling a wastegate and a compressor recirculation valve position in response to a pressure differential across an intake throttle to provide the desired or requested engine boost or torque reserve. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product includes instructions causing the computer to execute one or more of the operations, or to issue commands to other devices to execute one or more of the operations.

Figure 2:
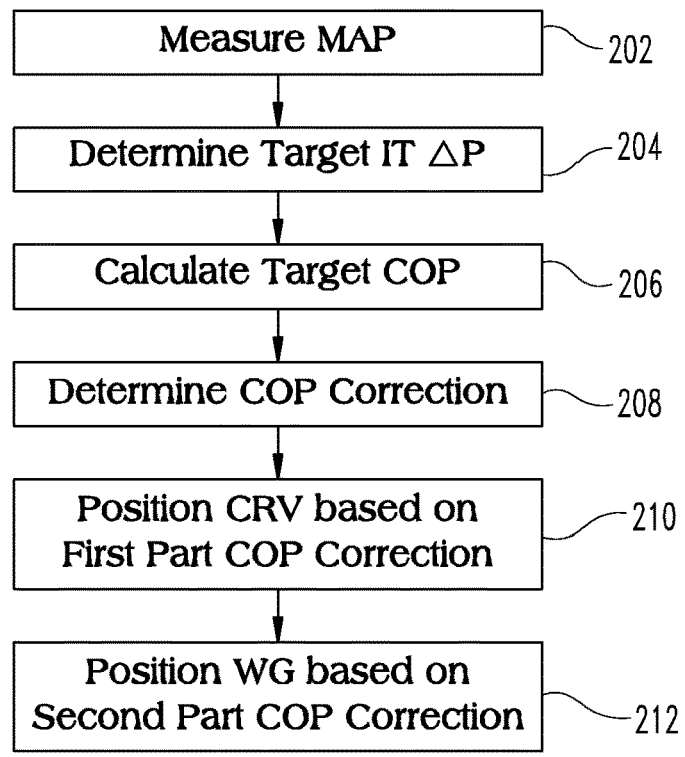
FIG. 2 is a flow diagram of a procedure for controlling a position of a compressor recirculation valve and the wastegate of the turbocharger.

FIG. 2 is a flow diagram of one embodiment of a procedure 200 for controlling compressor outlet pressure (COP) for improvement in speed stability and performance for engine 114 using the compressor recirculation valve 136 and wastegate valve 122. The control systems, procedures and apparatus disclosed herein improve system robustness due to uncertainties in combustion processes resulting from, for example, ambient conditions and fuel quality. COP is believed to be reasonably representative of the combustion uncertainties, so controlling COP to a desired target can improve engine robustness and performance.

It is desirable to minimize the pressure loss across the intake throttle (IT) 126 in order to improve steady state brake thermal efficiency. However, when the IT 126 is or is nearly fully open, the valve dynamics show that there is minimal change in flow across the IT 126, and this limits controllability over engine speed. In this scenario, if the COP is controlled, the input to the engine system is stable and helps to stabilize and improve engine performance.

The pressure loss across IT 126 is essentially the difference between the COP and the intake manifold absolute pressure (MAP). The throttle pressure loss (TPL) target is used to generate a compressor outlet pressure target. Procedure 200 includes operation 202 measure the intake manifold absolute pressure (MAP). Procedure 200 continues at operation 204 to determine a target IT differential pressure. Procedure 200 further includes an operation 206 to determine a target COP. The target COP is determined as the sum of the MAP and TPL target. When IT 126 has limited controllability over engine speed due to low TPL, the COP, which is input into the system, is held constant to improve speed stability. The target COP is increased or decreased in a stepwise manner as the MAP changes by more than a threshold amount due to ambient conditions or combustion recipe. This strategy to stepwise change and hold the target COP effectively decouples the uncertainties from combustion from the boost control.

Procedure 200 continues at operation 208 to determine a COP correction in response to the target COP and an actual or measured COP. In one embodiment, the COP correction is determined using feedback control such as a proportional-integral-derivative (PID) controller. Procedure 200 continues at operation 210 to position the CRV 136 based on a first part of the COP correction and at operation 212 to position wastegate valve 122 based on a second part of the COP correction. In response to the COP error, the controller 116 takes PID corrective action to position the CRV actuator 138, and a PID corrective action to position the wastegate valve 122.

Figure 3:
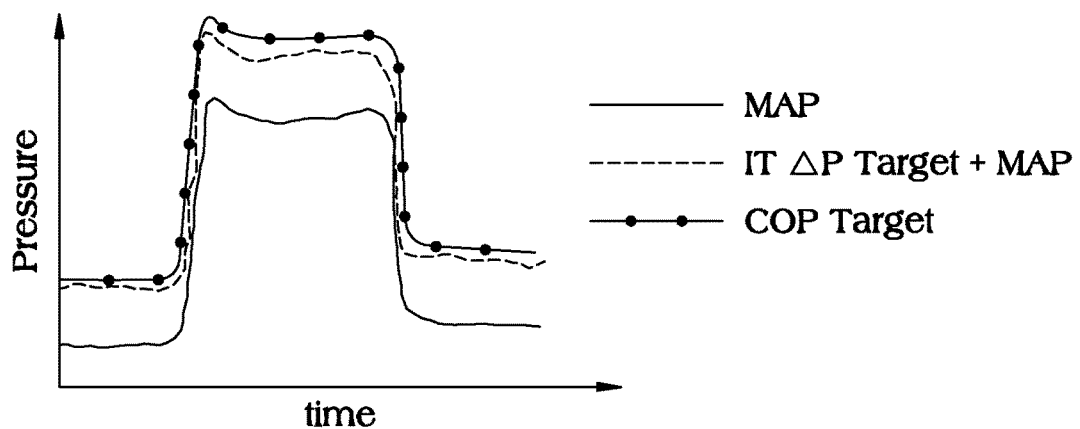
FIG. 3 is an example graph showing the target compressor outlet pressure over time based on intake manifold absolute pressure and desired intake throttle differential pressure.

In one embodiment, the first part of the COP correction is a PID correction amount in which the CRV positioned by the CRV actuator 138 in response to a CRV actuator position command from controller 116. The second part of the COP correction is a PID correction amount in which the wastegate valve 122 is positioned by the WG actuator 124 in response to a WG actuator position command from controller 116. FIG. 3 shows a graph of pressure on the y-axis and time on the x-axis of the relationship between the MAP, the IT 126 differential pressure and MAP, and the COP target. The target COP is the sum of the MAP and IT differential pressure target. The MAP has small uncertainties, even under steady state conditions, due to combustion and ambient conditions. Thus, the sum of the MAP and IT differential pressure target also includes uncertainties, but the target COP is held constant within a hysteresis band irrespective of small variations in MAP. The target COP is changed only in response to a threshold increase or decrease in MAP such as occurs in response to a load transient, as depicted by the large step change in MAP in FIG. 3.

Figure 4A:
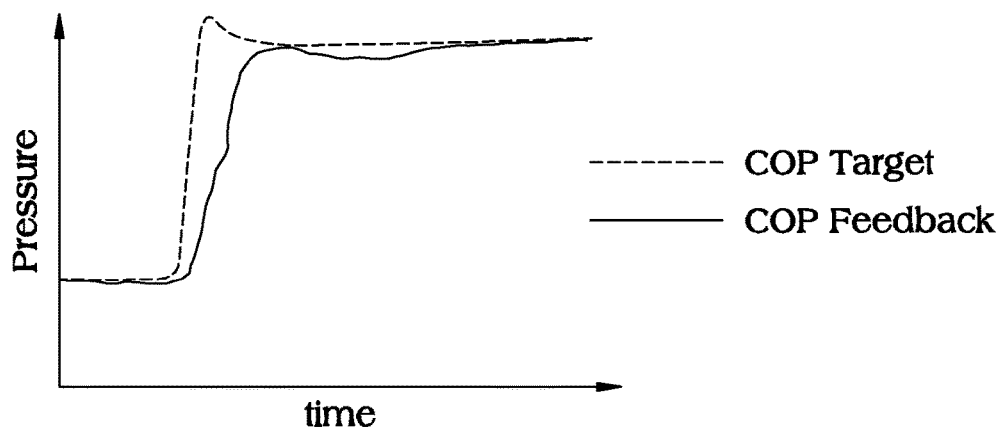
FIGS. 4A and 4B are example graphs showing feedback control of the compressor recirculation valve and the wastegate positioning to achieve the target compressor outlet pressure.
Figure 4B:
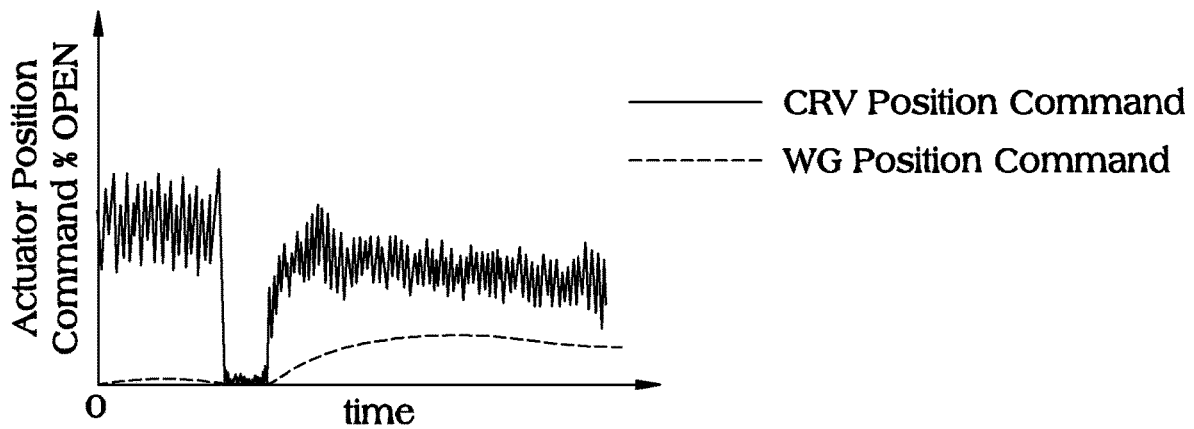

FIG. 4A shows the target COP and the COP feedback over time. In steady state the target COP is held constant irrespective of noise affecting MAP. When a step change in load occurs which causes the MAP to change as depicted in FIG. 4A, the target COP changes and the feedback control of COP changes the actual COP in response. FIG. 4B depicts the fast actuation of CRV 136 by using PID action control and the slow actuation of the WG valve 12 using PID action control.

The positioning of WG valve 122 influences turbine speed while the CRV 136 position redirects the amount of charge flow through the compressor 104. The sensitivity of COP is different for the two actuators. While control of WG valve 122 is a strong lever to control COP, engine speed stability is improved when CRV 136 is actuated fast enough to reject combustion uncertainties. Thus, feedback control of COP is provided with a PID type controller 116 in which PID action control of the CRV 136 is employed in conjunction with PID action of the WG valve 122.

One embodiment procedure includes an operation to determine the CRV actuator position command by selecting the CRV actuator position command from a number of CRV actuator position command solution values. Example operations to select the CRV actuator position command from the number of CRV actuator position command solution values include selecting a CRV actuator position command that provides a target exhaust flow through the compressor recirculation flow path 134 and/or through the compressor 104, and selecting a CRV actuator position command that is closest to a target exhaust flow through the compressor recirculation flow path 134 and/or compressor 104.

Another embodiment procedure includes an operation to determine the wastegate actuator position command by selecting the wastegate actuator position command from a number of wastegate actuator position command solution values. Example operations to select the wastegate actuator position command from the number of wastegate actuator position command solution values include selecting a wastegate actuator position command that provides a target exhaust flow through the wastegate 120 and/or turbine 108, and selecting a wastegate actuator position command that is closest to a target exhaust flow through the wastegate 120 and/or turbine 108.

The target IT 126 pressure differential may be determined according to any operation known in the art having the benefit of the disclosures herein. Example and non-limiting operations to determine the target IT 126 pressure differential include at least determining: a pressure differential corresponding to a load threshold (e.g., 10%, 25%, etc.) which load threshold may be a maximum load, a load at a present engine speed, or other load value; a specified pressure differential in absolute terms (e.g., 20 psia, 25 psia, 30 psia, etc.); and/or a pressure differential value at which empirical testing has shown the CRV 136 and wastegate valve 122 is sufficiently responsive under a normal actuator position control scheme. A value that is "sufficiently responsive" is definable by meeting a transient requirement, by meeting an engine speed or air flow rate rise time requirement, by meeting a driveability specification, and/or by meeting a transient requirement to meet driveability, emissions, transient performance, or other system delivery requirements.

Figure 5:
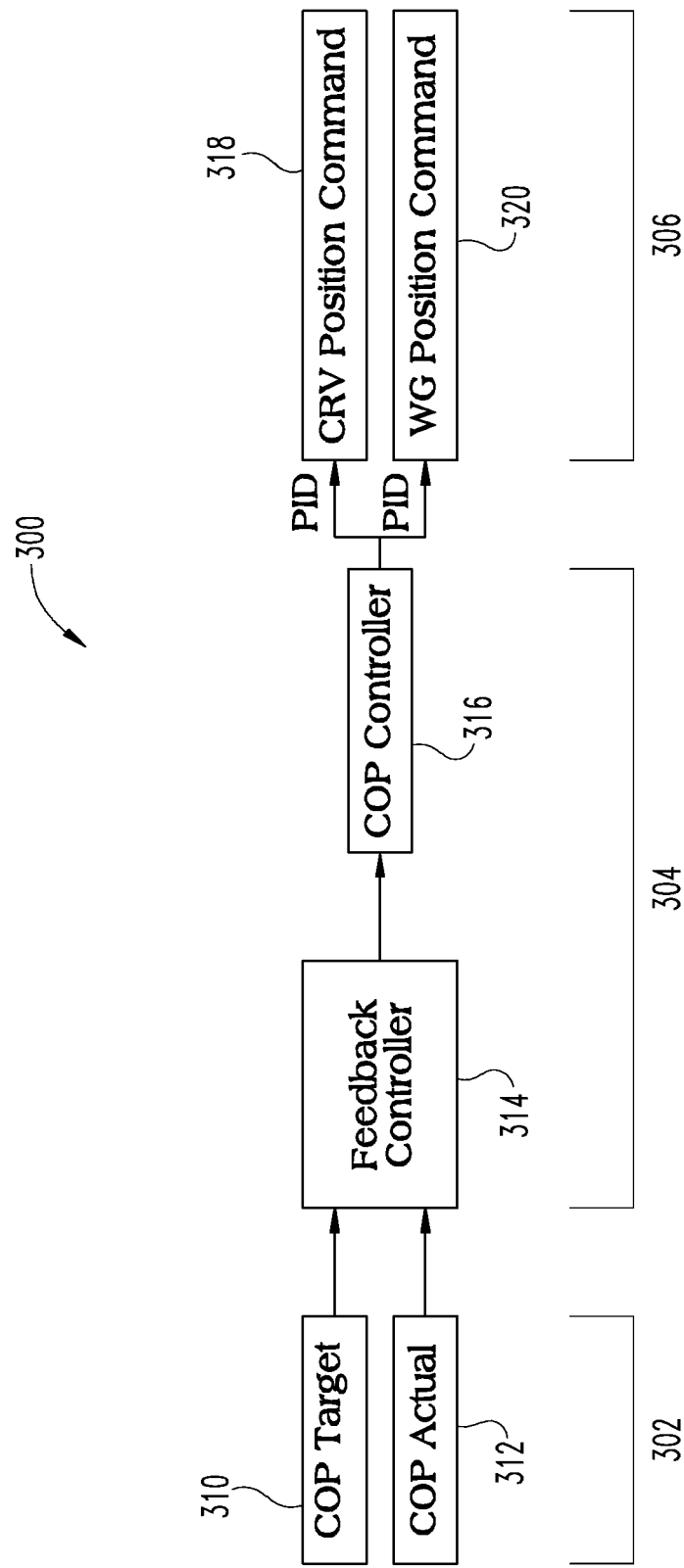
FIG. 5 is a schematic diagram of a processing subsystem for controlling compressor outlet pressure by adjusting a position of a compressor recirculation valve and the wastegate of the turbocharger.

FIG. 5 is a schematic illustration of a processing subsystem 300 including controller 116. The example processing subsystem 300 for controller 116 includes a reference generation module 302, a feedback control module 304, and an actuator positioning module 306. Other modules may also be present, and the described modules may be combined, or further separated into additional modules, and are not limited to the described modules.

The reference generation module 302 includes a target COP calculation 310 and an actual COP measurement 312 associated with system 100. The target COP calculation 310 can be performed or based on the MAP and desired pressure differential across IT 126 as discussed above. The actual COP may be from measurement of pressure at the compressor outlet or other suitable indicator or proxy for COP.

Feedback module 304 receives the target COP and a measured or actual COP and provides these values as an input to a feedback control processer 314. A COP controller 316 can then receive an output from feedback control processer 314 based on the target COP and actual COP. The COP controller 316 evaluates feedback controller output to provide a PID compensation for CRV position command 318 to CRV actuator 138 to positon CRV 136, and to provide PID compensation for WG position command 320 to WG actuator 124 to positon WG valve 122. The position of CRV 136 and WG valve 122 are selected to provide the target COP.

Control of engine 114 generally operates from a previously known charge or intake flow target value (e.g., mass flow of air or combined air and EGR flow at the engine inlet) which may be provided by an engine controller (not shown). The engine controller may operate on the same device, or be a separate device, as the controller 116. The target COP can be calculated from the intake manifold pressure (or other target intake pressure downstream of intake throttle 126 and upstream of the cylinders of engine 114) and the target intake throttle pressure differential. Additionally or alternatively, the target intake throttle pressure differential can be a direct input to the controller 116 provided from, for example, an engine controller.

As is evident from the figures and text presented above, a variety of embodiments according to the present disclosure are contemplated.

According to one aspect, a method includes determining a target pressure differential across an intake throttle of an internal combustion engine. The internal combustion engine includes a turbocharger with a compressor and a compressor recirculation valve including a first controllable actuator for controlling a position of the compressor recirculation valve. The turbocharger further includes a turbine with a turbine bypass and a wastegate including a second controllable actuator for controlling a position of the wastegate in the turbine bypass. The method further includes determining a target compressor outlet pressure in response to an intake manifold pressure of the internal combustion engine and the target pressure differential across the intake throttle; determining, with a feedback control output, a compressor outlet pressure correction in response to the target compressor outlet pressure and an actual compressor outlet pressure; determining a compressor recirculation valve position command for the first controllable actuator based on the feedback control output to provide a first part of the compressor outlet pressure correction; determining a wastegate position command for the second controllable actuator based on the feedback control output to provide a second part of the compressor outlet pressure correction; and positioning the compressor recirculation valve with the first controllable actuator in response to the compressor recirculation valve position command and positioning the wastegate with the second controllable actuator in response to the wastegate actuator position command.

In one embodiment, the internal combustion engine includes a charge cooler upstream of the intake throttle and downstream of the compressor of the turbocharger. In another embodiment, the first part of the compressor outlet pressure correction includes a proportional, derivative and integral feedback control response. In a refinement of this embodiment, the second part of the compressor outlet pressure correction includes a proportional, derivative and integral feedback control response.

In another embodiment, the target compressor outlet pressure is constant during steady state engine operating conditions. In yet another embodiment, the target compressor outlet pressure changes in response to a threshold change in the intake manifold pressure.

In another aspect, an apparatus includes an electronic controller configured to determine a compressor recirculation valve command that controls a compressor recirculation valve actuator to position a compressor recirculation valve in a compressor recirculation flow path of an internal combustion engine in response to a feedback control output. The electronic controller is further configured to determine a wastegate actuator position command that controls a wastegate actuator to position a wastegate in a turbine bypass of the internal combustion engine in response to the feedback control output. The feedback control output provides a target compressor outlet pressure upstream of the internal combustion engine. In order to provide the target compressor outlet pressure, the compressor recirculation valve actuator is operable to position the compressor recirculation valve in response to the compressor recirculation valve command and the wastegate actuator is operable to position the wastegate in response to the wastegate actuator position command.

In one embodiment, the target compressor outlet pressure is constant during steady state engine operating conditions. In another embodiment, the controller determines the target compressor outlet pressure in response to an intake manifold pressure of an intake manifold of the internal combustion engine and a target intake throttle pressure differential of an intake throttle upstream of the intake manifold. In a refinement of this embodiment, the target compressor outlet pressure changes in response to a threshold change in the intake manifold pressure.

In a further embodiment, the feedback control output includes a target compressor outlet pressure correction and the electronic controller is configured to determine the compressor recirculation valve position command for a first part of the compressor outlet pressure correction and the electronic controller is configured to determine the wastegate position command for a second part of the compressor outlet pressure correction. In a refinement of this embodiment, the first part of the compressor outlet pressure correction is based on a proportional, integral and derivative feedback control response. In a further refinement, the second part of the compressor outlet pressure correction is based on a proportional, integral and derivative feedback control response.

According to yet another aspect, a system includes an internal combustion engine pneumatically coupled to a compressor of a turbocharger on an inlet side of the engine and to a turbine of the turbocharger on an outlet side of the engine. The inlet side of the internal combustion engine further includes an intake throttle, and the compressor includes a compressor recirculation flow path and a compressor recirculation valve in the compressor recirculation flow path connected to a compressor recirculation valve actuator responsive to a compressor recirculation valve actuator command. The turbine includes a wastegate connected to a wastegate actuator responsive to a wastegate actuator position command. The system also includes a controller configured to determine a compressor outlet pressure correction in response to a target compressor outlet pressure and an actual compressor outlet pressure. The compressor recirculation valve command is based on a first part of the compressor outlet pressure correction to adjust a position of the compressor recirculation valve with the compressor recirculation valve actuator, and the wastegate actuator position command is based on a second part of the compressor outlet pressure correction to adjust a position of the wastegate with the wastegate actuator.

In one embodiment, the controller is configured to determine the target compressor outlet pressure in response to an intake manifold pressure of an intake manifold of the internal combustion engine and a target intake throttle pressure differential across the intake throttle. In another embodiment, the system includes a charge cooler between the intake throttle and the compressor of the turbocharger and an exhaust gas recirculation system connecting the inlet and outlet sides of the engine.

In yet another embodiment, the controller is configured to determine the compressor outlet pressure correction via a feedback control output. In a refinement of this embodiment, the target compressor outlet pressure changes in response to a threshold change in the intake manifold pressure. In a further refinement, the controller is a proportional, derivative and integral controller configured to determine the first part of the target compressor outlet pressure correction as a proportional, integral and derivative feedback control response. In another refinement, the controller is a proportional-integral-derivative controller configured to determine the first part of the target compressor outlet pressure correction as a proportional, derivative and integral feedback control response and the second part of the compressor outlet pressure correction as a proportional, derivative and integral feedback control response.

While the invention has been illustrated and described in detail in the drawings and foregoing description, the same is to be considered as illustrative and not restrictive in character, it being understood that only certain example embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   determining a target pressure differential across an intake throttle of an internal combustion engine, the internal combustion engine including a turbocharger with a compressor and a compressor recirculation valve including a first controllable actuator for controlling a position of the compressor recirculation valve, the turbocharger further including a turbine with a turbine bypass and a wastegate including a second controllable actuator for controlling a position of the wastegate in the turbine bypass;
   determining a target compressor outlet pressure in response to an intake manifold pressure of the internal combustion engine and the target pressure differential across the intake throttle;
   determining, with a feedback control output, a compressor outlet pressure correction in response to the target compressor outlet pressure and an actual compressor outlet pressure;
   determining a compressor recirculation valve position command for the first controllable actuator based on the feedback control output to provide a first part of the compressor outlet pressure correction;
   determining a wastegate position command for the second controllable actuator based on the feedback control output to provide a second part of the compressor outlet pressure correction; and
   positioning the compressor recirculation valve with the first controllable actuator in response to the compressor recirculation valve position command and positioning the wastegate with the second controllable actuator in response to the wastegate actuator position command.

2. The method of claim 1, wherein the internal combustion engine includes a charge cooler upstream of the intake throttle and downstream of the compressor of the turbocharger.

3. The method of claim 1, wherein the target compressor outlet pressure is constant during steady state engine operating conditions.

4. The method of claim 1, wherein the target compressor outlet pressure changes in response to a threshold change in the intake manifold pressure.

5. The method of claim 1, wherein the first part of the compressor outlet pressure correction includes a proportional, derivative and integral feedback control response.

6. The method of claim 5, wherein the second part of the compressor outlet pressure correction includes a proportional, derivative and integral feedback control response.

7. An apparatus, comprising:
   an electronic controller configured to determine a compressor recirculation valve command that controls a compressor recirculation valve actuator to position a compressor recirculation valve in a compressor recirculation flow path of an internal combustion engine in response to a feedback control output, the electronic controller further being configured to determine a wastegate actuator position command that controls a wastegate actuator to position a wastegate in a turbine bypass of the internal combustion engine in response to the feedback control output, wherein the feedback control output provides a target compressor outlet pressure upstream of the internal combustion engine that is determined by the electronic controller in response to an intake manifold pressure and a target pressure differential across an intake throttle upstream of an intake manifold of the internal combustion engine; and
   wherein, in order to provide the target compressor outlet pressure, the compressor recirculation valve actuator is operable to position the compressor recirculation valve in response to the compressor recirculation valve command and the wastegate actuator is operable to position the wastegate in response to the wastegate actuator position command, and wherein the electronic controller is configured to control a compressor outlet pressure based on the target compressor outlet pressure.

8. The apparatus of claim 7, wherein the target compressor outlet pressure changes in response to a threshold change in the intake manifold pressure.

9. The apparatus of claim 7, wherein the target compressor outlet pressure is constant during steady state engine operating conditions.

10. The apparatus of claim 7, wherein the feedback control output includes a target compressor outlet pressure correction and the electronic controller is configured to determine the compressor recirculation valve position command for a first part of the compressor outlet pressure correction and the electronic controller is configured to determine the wastegate position command for a second part of the compressor outlet pressure correction.

11. The apparatus of claim 10, wherein the first part of the compressor outlet pressure correction is based on a proportional, integral and derivative feedback control response.

12. The apparatus of claim 11, wherein the second part of the compressor outlet pressure correction is based on a proportional, integral and derivative feedback control response.

13. A system, comprising:
an internal combustion engine pneumatically coupled to a compressor of a turbocharger on an inlet side of the engine and to a turbine of the turbocharger on an outlet side of the engine, the inlet side of the internal combustion engine further including an intake throttle, the compressor including a compressor recirculation flow path and a compressor recirculation valve in the compressor recirculation flow path connected to a compressor recirculation valve actuator responsive to a compressor recirculation valve actuator command, the turbine comprising a wastegate connected to a wastegate actuator responsive to a wastegate actuator position command; and
a controller configured to determine a compressor outlet pressure correction in response to a target compressor outlet pressure and an actual compressor outlet pressure, the compressor recirculation valve command being based on a first part of the compressor outlet pressure correction to adjust a position of the compressor recirculation valve with the compressor recirculation valve actuator and the wastegate actuator position command being based on a second part of the compressor outlet pressure correction to adjust a position of the wastegate with the wastegate actuator, wherein the controller is configured to determine the target compressor outlet pressure in response to an intake manifold pressure of an intake manifold of the internal combustion engine and a target intake throttle pressure differential across the intake throttle,
wherein the controller is configured to control a compressor outlet pressure based on the compressor outlet pressure correction.

14. The system of claim 13, further comprising:
a charge cooler between the intake throttle and the compressor of the turbocharger; and
an exhaust gas recirculation system connecting the inlet and outlet sides of the engine.

15. The system of claim 13, wherein the controller is configured to determine the compressor outlet pressure correction via a feedback control output.

16. The system of claim 15, wherein the target compressor outlet pressure changes in response to a threshold change in the intake manifold pressure.

17. The system of claim 16, wherein the controller is a proportional, derivative and integral controller configured to determine the first part of the target compressor outlet pressure correction as a proportional, integral and derivative feedback control response.

18. The system of claim 16, wherein the controller is a proportional-integral-derivative controller configured to determine the first part of the target compressor outlet pressure correction as a proportional, derivative and integral feedback control response and the second part of the compressor outlet pressure correction as a proportional, derivative and integral feedback control response.

* * * * *